(12) United States Patent
Adachi et al.

(10) Patent No.: US 6,411,808 B1
(45) Date of Patent: Jun. 25, 2002

(54) PORTABLE TERMINAL EQUIPMENT

(75) Inventors: Naofumi Adachi, Saitama; Teru Saitou, Tochigi; Akira Ootake, Tochigi; Yoshihito Takeshima, Tochigi; Ryouji Terada, Tochigi, all of (JP)

(73) Assignee: Aiwa Co., Ltd., Tokyo (JP)

( * ) Notice: Subject to any disclaimer, the term of this patent is extended or adjusted under 35 U.S.C. 154(b) by 0 days.

(21) Appl. No.: 09/155,266

(22) PCT Filed: Mar. 26, 1997

(86) PCT No.: PCT/JP97/01014

§ 371 (c)(1),
(2), (4) Date: Mar. 8, 1999

(87) PCT Pub. No.: WO97/36387

PCT Pub. Date: Oct. 2, 1997

(30) Foreign Application Priority Data

Mar. 27, 1996 (JP) ............................................. 8-072872

(51) Int. Cl.$^7$ ................................................. H04B 7/26
(52) U.S. Cl. ..................... 455/434; 455/515; 455/574; 455/161.2
(58) Field of Search ............................. 455/502, 515, 455/434, 574, 525, 161.1, 343, 38.3, 62, 435, 456, 421, 524, 67.1, 161.2, 181.1, 572; 370/350, 336, 337, 311; 375/352, 353

(56) References Cited

U.S. PATENT DOCUMENTS

| | | | | |
|---|---|---|---|---|
| 4,903,320 A | * | 2/1990 | Hanawa | 455/434 |
| 4,977,611 A | * | 12/1990 | Maru | 455/161.2 |
| 5,507,039 A | * | 4/1996 | Honma | 455/343 |
| 5,794,146 A | * | 8/1998 | Sevcik et al. | 455/434 |
| 6,115,582 A | * | 9/2000 | Ishida | 455/161.1 |
| 6,292,660 B1 | * | 9/2001 | Hartless et al. | 455/434 |

FOREIGN PATENT DOCUMENTS

| | | |
|---|---|---|
| JP | 63 10 3523 | 5/1988 |
| JP | 4 120 920 | 4/1992 |
| JP | 4 304 043 | 10/1992 |
| JP | 6 284 068 | 10/1994 |

* cited by examiner

*Primary Examiner*—Lester G. Kincaid
(74) *Attorney, Agent, or Firm*—Smith-Hill and Bedell

(57) ABSTRACT

This invention relates to a portable terminal equipment establishing synchronism with a control channel by intermittently receiving the control channel when the synchronism with the control channel is made off. When the synchronism with the control channel is made off, the equipment is set to a control channel receiving state for a period of time W2 every period of time t1 (ST3–ST10). When the synchronism with the control channel is not established in the receiving state which is set to N (=X+5) times (X=number of off-synchronism during the past one hour), the equipment is set to shifting to a control channel receiving state for the period of time W2 every period of time t2 (ST2 and ST11–ST18). The more frequently a user moves, the larger the time X of off-synchronism becomes and thus N becomes larger by that amount so that a time period until the interval t1 between each period of the control receiving state is shift to the interval t2, is prolonged. Therefore, when the user moves frequently and the possibility of the equipment entering the service area of the cell station from the outside is high, the control channel receiving state brings about frequently. When the user does not move frequently and the possibility of the equipment entering the service area of the cell station from the outside is low, the frequency of bring about the control channel receiving state becomes low and thus emphasis is laid on the consumption of the battery.

15 Claims, 11 Drawing Sheets

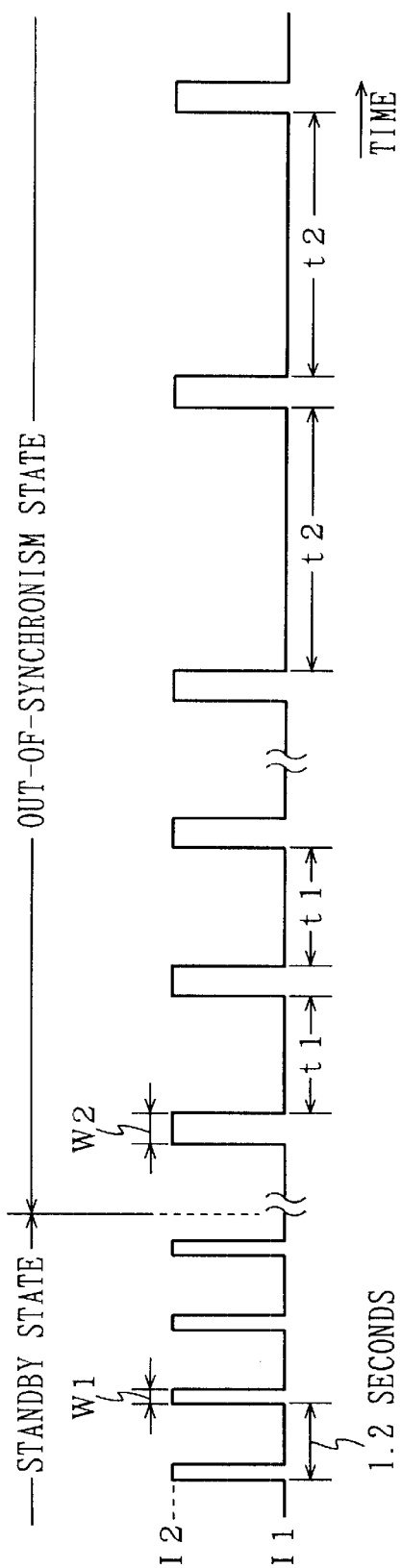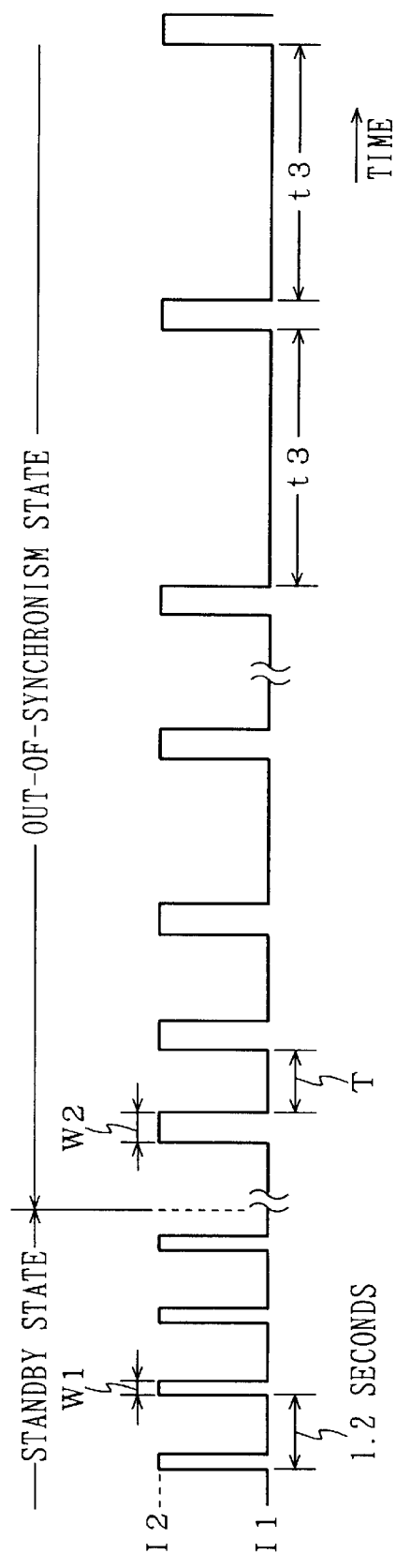

PORTABLE TERMINAL EQUIPMENT

TECHNICAL FIELD

The present invention relates to a portable terminal equipment such as a portable telephone or the like. In details, the present invention relates to a portable terminal equipment capable of preventing a battery from its consumption in compliance with a situation of moving of a user by setting a control channel receiving state of the equipment at a frequency such that, in the case of out-of-synchronism with a control channel, the larger a number of out-of-synchronism during a past constant time period becomes, the higher the frequency is made.

TECHNICAL FIELD

In a simplified type portable telephone (PHS: Personal Handyphone System), in the case of out-of-synchronism with a control channel, the synchronism with the control channel is established by receiving the control channel transmitted from a cell station and then a location thereof is registered to the cell station and the telephone shifts to a standby state.

In this case, when the synchronism with the control channel is made off, the control channel receiving state is not always set but the receiving state is set intermittently and a receiving circuit is brought into an OFF state when the control channel is not received, thereby preventing a battery from its consumption. Further, when the synchronism with the control channel cannot be established even after an elapse of a constant time period, it is a well known art that an interval between each period of the control channel receiving state is prolonged and thus the consumption of a battery is further prevented.

As described above, according to the conventional simplified type portable telephone, regardless of whether a user moves frequently, when the synchronism with the control channel is made off, a state where the control channel is intermittently received is brought about and further, when the synchronism with the control channel cannot be established after an elapse of a constant time period, an interval between each period of the control channel receiving state is prolonged.

However, in respect of a frequently moving user, even if the user moves outside of the service area of a cell station, a possibility where the user moves immediately inside of the service area of the cell station is high and accordingly, it is preferable to frequently bring about a state of receiving the control channel. In the meantime, in respect of an infrequently moving user, when the user moves outside of the service area of the cell station, a possibility where the user moves inside of the service area of the cell station again is low and accordingly, a frequency of bringing about the control channel receiving state may be low.

Hence, it is an object of the present invention to provide a portable terminal equipment capable of prevent a battery from its consumption in compliance with a situation of moving of a user.

DISCLOSURE OF THE INVENTION

According to the present invention, there is provided a portable terminal equipment establishing synchronism with a control channel by intermittently receiving the control channel transmitted from a cell station when the synchronism with the control channel is made off and then registering a location of the equipment to the cell station and shifting to a standby state, comprising out-of-synchronism detecting means for detecting that synchronism with the control channel is made off, out-of-synchronism time number counting means for counting a number of times of out-of-synchronism during a past constant time period, and reception controlling means for bringing about a control channel receiving state at a frequency such that, when the out-of-synchronism with the control channel is detected by the out-of-synchronism detecting means, the more the number of times of out-of-synchronism, during the past constant time period, provided by the out-of-synchronism time number counting means becomes, the higher the frequency is made.

For example, when a user moves outside of service area of a cell station and the equipment cannot receive the control channel in its standby state, the out-of-synchronism detecting means detects that the synchronism with the control channel is made off. Further, the out-of-synchronism time number counting means provides the number of times of out-of-synchronism during the past constant time period. The more frequently a user moves, the larger the number of times of out-of-synchronism becomes since chances of the out-of-synchronism are increased. When it is detected that the synchronism with the control channel is made off, a state of intermittently receiving the control channel is brought about, and in this case, the reception controlling means controls the equipment and brings about a control channel receiving state at a frequency such that the more the number of times of out-of-synchronism during the past constant time period becomes, the higher the frequency is made. In such a case, the more frequently the user moves, the more frequently the control channel receiving state is brought about.

BRIEF DESCRIPTION OF DRAWINGS

FIG. 9 illustrates drawings showing waveforms of consumption current in awaiting states and out-of-synchronism states.

BEST MODE FOR CARRYING OUT THE INVENTION

Figure 1:
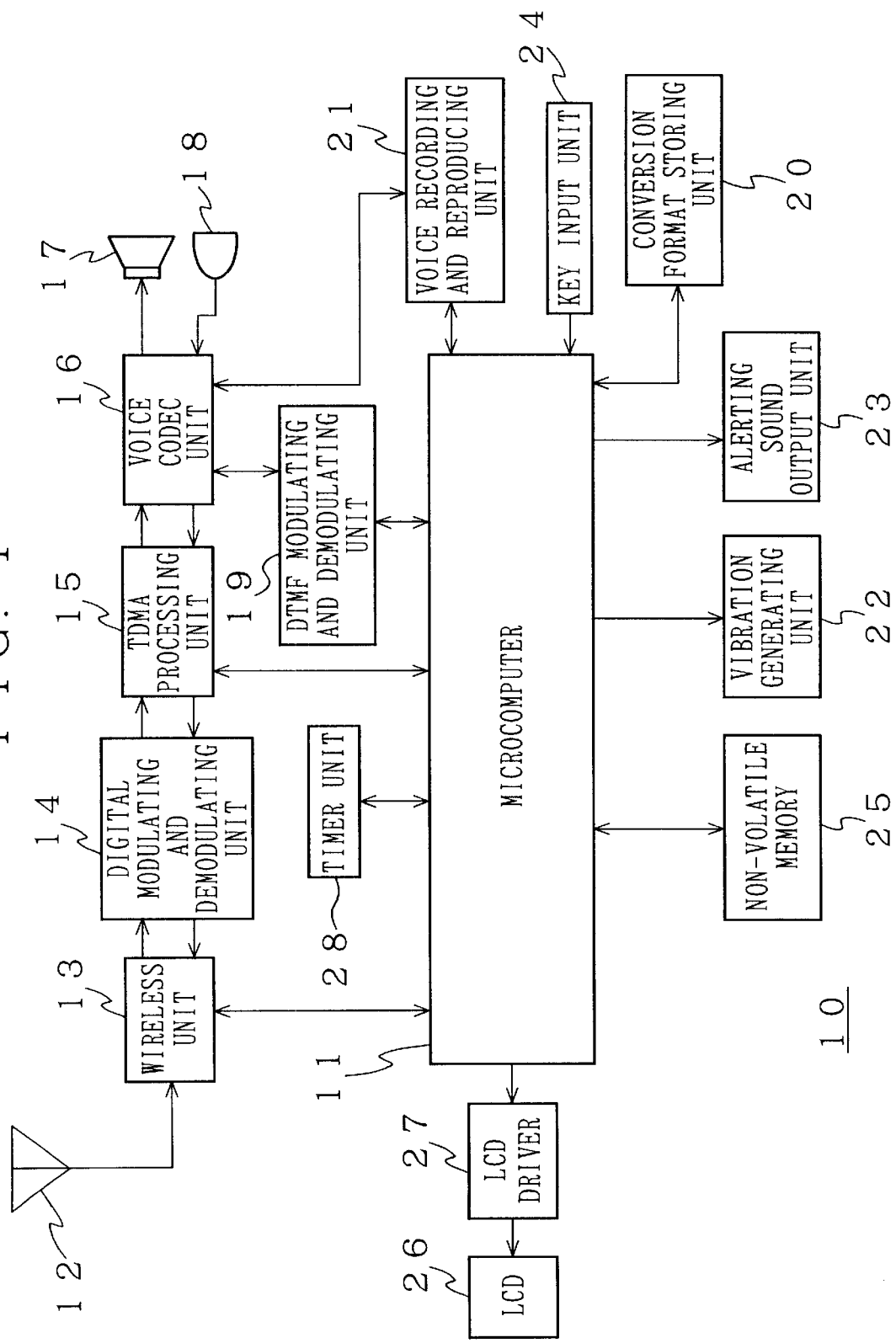
FIG. 1 is a block diagram showing the constitution of a simplified type portable telephone as a best mode of this invention.

FIG. 1 shows a simplified type portable telephone 10 according to an embodiment of this invention. The telephone 10 uses a battery as its power source.

The telephone 10 is provided with a microcomputer 11 for controlling a total of a system, an antenna 12 for the transmission and reception of signal, a wireless unit 13 downconverting a receiving signal at a predetermined frequency caught by the antenna 12 to provide a π/4 shift QPSK (Quadrature Phase Shift Keying) signal and upconverting a π/4 shift QPSK signal outputted from a digital modulating and demodulating unit 14, mentioned later, to provide a transmitting signal at a predetermined frequency, and the digital modulating and demodulating unit 14 demodulating the π/4 shift QPSK signal outputted from the wireless unit 13 to provide the receiving data and modulating the transmitting data outputted from a TDMA (Time Division Multiple Access) processing unit, mentioned later, to provide the π/4 shift QPSK signal.

The telephone 10 is also provided with the TDMA processing unit 15 for selecting the data of down slots, which are previously set, from a receiving data (time division multiplex data in a plurality of slots) outputted from the digital modulating and demodulating unit 14, for separating the data into control data and compressed voice data and for multiplexing the compressed voice data outputted from a voice codec unit 16, mentioned later, and the control data outputted from the microcomputer 11 to the up slots which are previously set.

Further, the telephone 10 is provided with the voice codec unit 16 for carrying out decoding processing (including error correcting processing) in respect of the compressed voice data outputted from the TDMA processing unit 15 to provide a receiving voice signal and for carrying out compressed code forming processing (including an additional processing of the error correcting processing) in respect of a transmitting voice signal to provide the compressed voice data, a speaker (receiver) 17 for being supplied with the receiving voice signal outputted from the voice codec unit 16 and a microphone (transmitter) 18 for supplying a transmitting voice signal to the voice codec unit 16.

Additionally, the telephone 10 is provided with a DTMF modulating and demodulating unit 19 for converting a DTMF (Dual Tone Multiple Frequency) signal provided at the voice codec unit 16 as a receiving voice signal into key data in correspondence with special input keys such as "*" and "#" or ten keys of "0" through "9" to supply the data to the microcomputer 11 and for converting the key data in correspondence with special input keys such as "*" and "#" or ten keys of "0" through "9" outputted from the microcomputer 11 into the DTMF signal to supply it to the voice codec unit 16 as a transmitting voice signal, and a conversion format storing unit 20 for converting the key data outputted from the DTMF modulating and demodulating unit 19 into character data. The conversion format storing unit 20 is connected to the microcomputer 11.

Still further, the telephone 10 is provided with a voice recording and reproducing unit 21 for recording a receiving voice signal provided by the voice codec unit 16 and for reproducing a recorded receiving voice signal or a previously recorded answer message (voice signal) by operation of a key input unit, mentioned later, or control of the microcomputer 11 in an absence recording mode, a vibration generating unit 22 for vibrating a main body of the telephone by control of the microcomputer 11 when a signal is received in the case where a vibration mode is set, and an alerting sound output unit 23 for outputting alerting sound by control of the microcomputer 11 when a signal is received in the case where the vibration mode is not set. In this case, the voice recording and reproducing unit 21 is provided with, for example, a semiconductor memory as a storage medium for a voice signal. Operation of the voice recording and reproducing unit 21 is controlled by the microcomputer 11 and a signal indicating the operational state of the voice recording and reproducing unit 21 is supplied from the unit 21 to the microcomputer 11.

Further, the telephone 10 is provided with the key input unit 24 arranged with a speaking key for instructing a call or for responding when called, a termination key for terminating speech, a function key for shifting to a telephone book registering mode and for setting an absence recording mode or a vibration mode and so on, ten keys and special input keys for inputting a telephone number or the like and a recording key, a reproducing key, a sound volume adjusting key and so on each of which is provided for operating the recording and reproducing of the voice recording and reproducing unit 21. The key input unit 24 is connected to the microcomputer 11 and key operation of the key input unit 24 is monitored by the microcomputer 11.

Further, the telephone 10 is provided with a non-volatile memory 25 for storing telephone book data, redial data, character message data transmitted from the called party, mode setting information and so on, a timer unit 28 for counting a time period from an arbitrary time point by control of the microcomputer 11 and a liquid crystal display (LCD: Liquid Crystal Display) 26 for displaying a state of a system, the telephone number of the called party in calling and character message transmitted from the called party and so on. The liquid crystal display 26 is driven by an LCD driver 27 controlled by the microcomputer 11.

Figure 2:
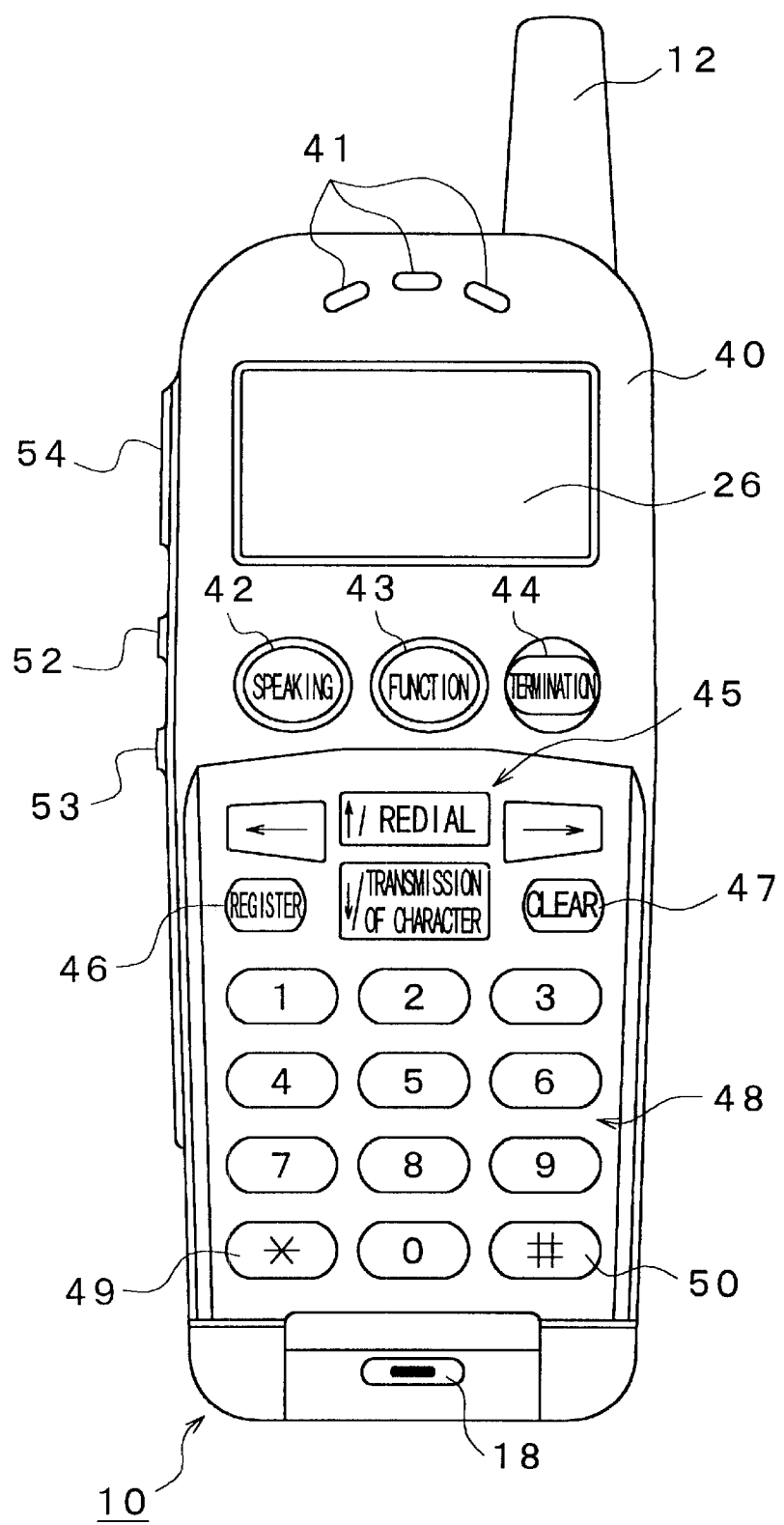
FIG. 2 is a front view showing the simplified type portable telephone (where a key protecting lid is detached).
Figure 3:
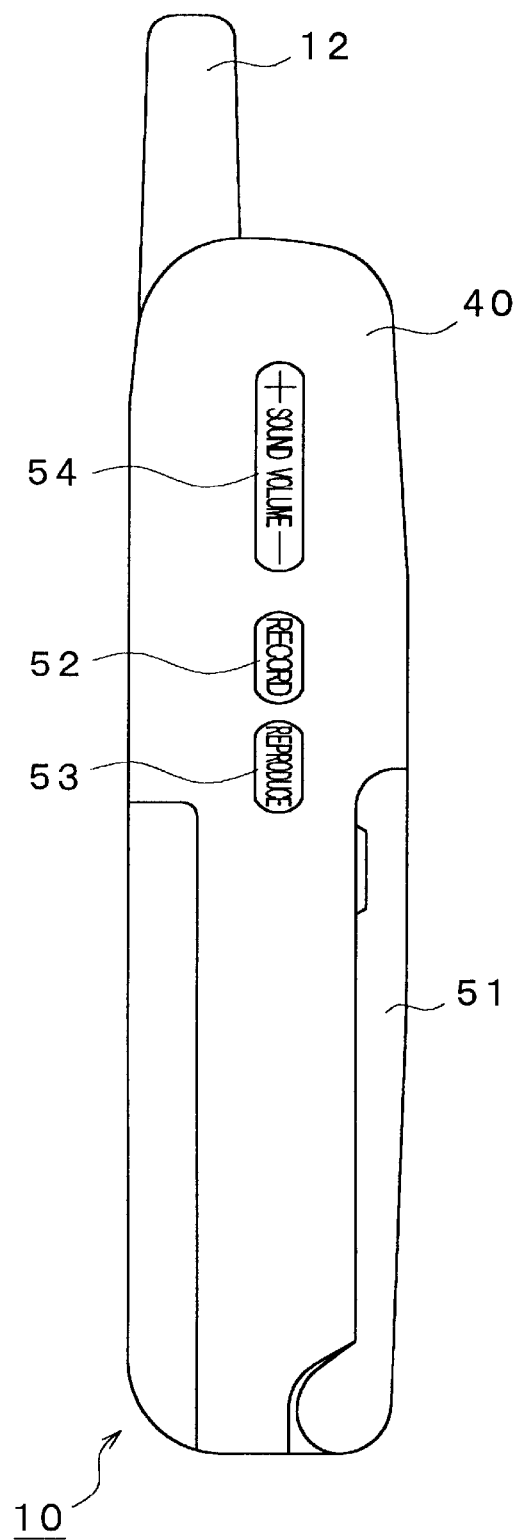
FIG. 3 is a side view showing the simplified type portable telephone.

FIG. 2 and FIG. 3 show the outlook of the telephone 10 and portions in correspondence with those in FIG. 1 are shown by attaching the same notations thereto.

The antenna 12 is arranged at the upper end portion of a telephone main body 40. Further, voice passing holes 41 for leading out voice from a built-in speaker to outside is formed at an upper portion of the main body 40 and the liquid crystal display 26 is arranged thereunder. Further, the microphone 18 is arranged at a lower portion of the main body 40. Further, a speaking key 42, a function key 43 and a termination key 44 are arranged to align laterally at a central portion of the main body 40 and on the lower side of the liquid crystal display 26. The termination key 44 constitutes a power ON/OFF key when it is pushed for a long period of time.

Additionally, cursor moving keys 45 for moving the cursor up and down to right and left, a registration key 46 for shifting the system to a telephone book registering mode or the like, a clear key 47 for clearing input data, ten keys 48 and special input keys 49 and 50 are arranged on the lower side of the keys 42 through 44. In this case, "↑" key constituting the cursor moving key 45 serves also as a key for initiating the search of redial data or telephone book data and "↓" key serves also as a key for shifting to a character transmitting mode during a telephone conversation and for confirming received character data.

Further, the main body 40 is arranged with a key protecting lid 51 which is constituted openably and closably with a portion of arranging the microphone 18 as a fulcrum. By closing the key protecting lid 51, the keys 45 through 50 are covered. Therefore, it is necessary to operate the keys 45 through 50 in a state where the key protecting lid 51 is opened. Incidentally, FIG. 2 shows a state where the key protecting lid 51 is removed.

Further, a recording key 52 and a reproducing key 53 each of which is provided for operating recording and reproducing of the voice recording and reproducing unit 21 (see FIG. 1) and a sound volume adjusting key 54 for adjusting sound volume, are arranged at a side face of the main body 40. The sound volume adjusting key 54 is constituted such that when+side thereof is operated to push, the sound volume is increased and conversely, when—side is operated to push, the sound volume is reduced.

Next, an explanation will be given of the operation of the telephone 10 shown by FIG. 1.

When the power source is made ON, the telephone is brought to a state where the synchronism with a control channel is made off and accordingly, establishment of synchronism with the control channel is carried out after receiving the control channel transmitted from a cell station. Further, thereafter, location registration indicating that the telephone stays within the service area of the service station is carried out. The location registration is carried out by using a speaking channel. After finishing the location registration, the telephone returns to its control channel receiving state and is brought into a standby state.

Figure 4:
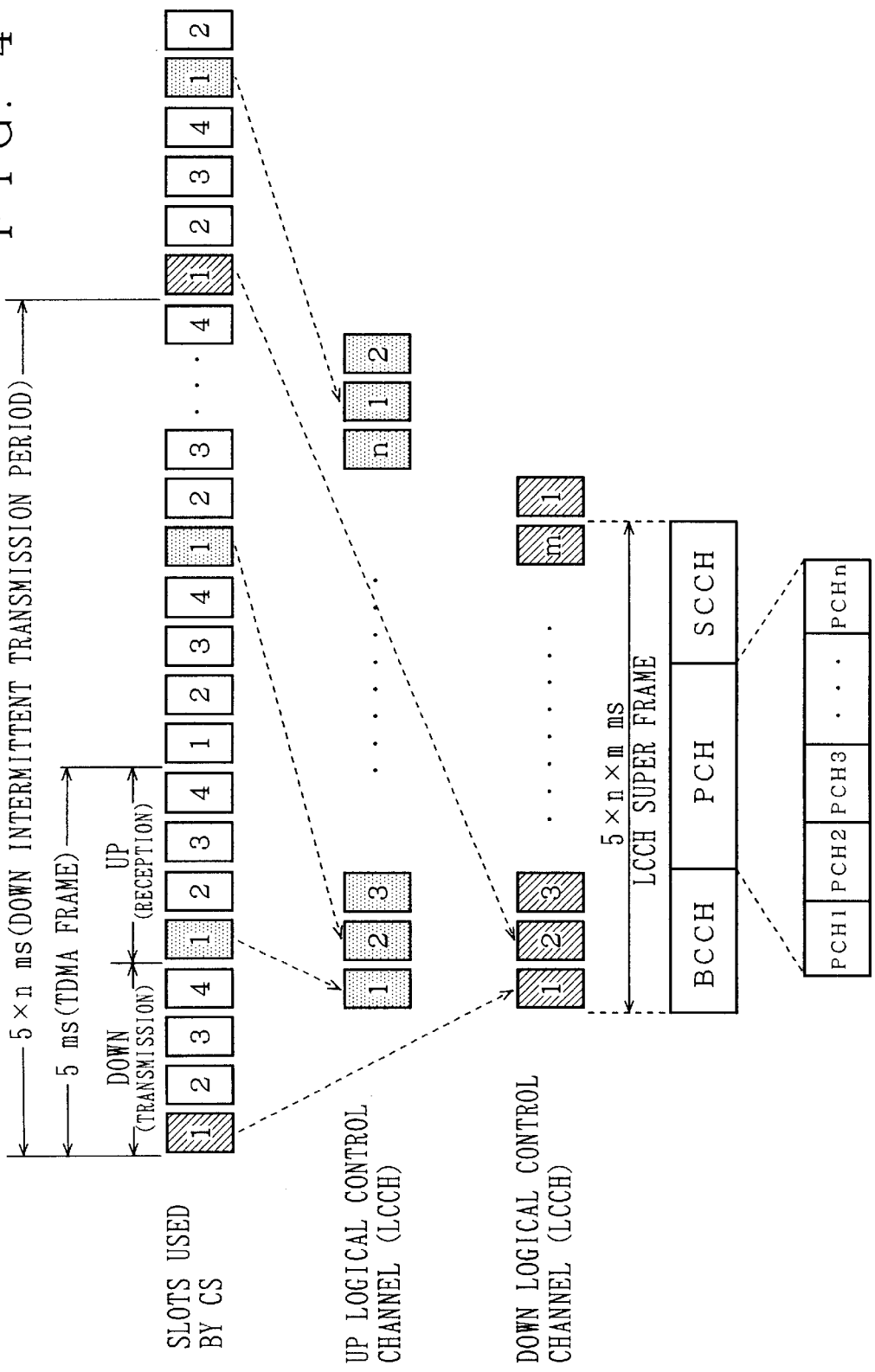
FIG. 4 is a diagram showing the constitution of a logical control channel (LCCH).

FIG. 4 shows an example of the constitution of a logical control channel (LCCH). Incidentally, this is an example in which a first slot of a TDMA frame is allocated to the logical control channel (LCCH) and an LCCH super frame is constituted by m of intermittently transmitted frames at every nTDMA frames.

According to slots to be used by a cell station (CS), a TDMA frame of 5 [ms] is constituted by 4 slots of down (transmission) and 4 slots of up (reception) successive thereto. Further, slots constituting a down logical control channel (LCCH) are present at every nTDMA frame. That is, a down intermittent transmitting period is 5×n [ms].

Further, a minimum period (5×n×m [ms]) of a down logical control channel (LCCH) designating slot positions of all of LCCH elements is defined as an LCCH super frame. The down logical control channel (LCCH) is constituted by a broadcast control channel (BCCH), a paging channel (PCH) and a signaling control channel (SCCH). BCCH is transmitted at front slots of the LCCH super frame and a position of a front of LCCH super frame is informed by transmitting BCCH. In the meantime, an up logical control channel (LCCH) is constituted by a signaling control channel (SCCH). A position of a slot in the up logical control channel (LCCH) is informed from the cell station (CS) to a personal station (PS) by information elements constituting a carrier for control in a message for the broadcast information of wireless channel on BCCH.

Figure 5:
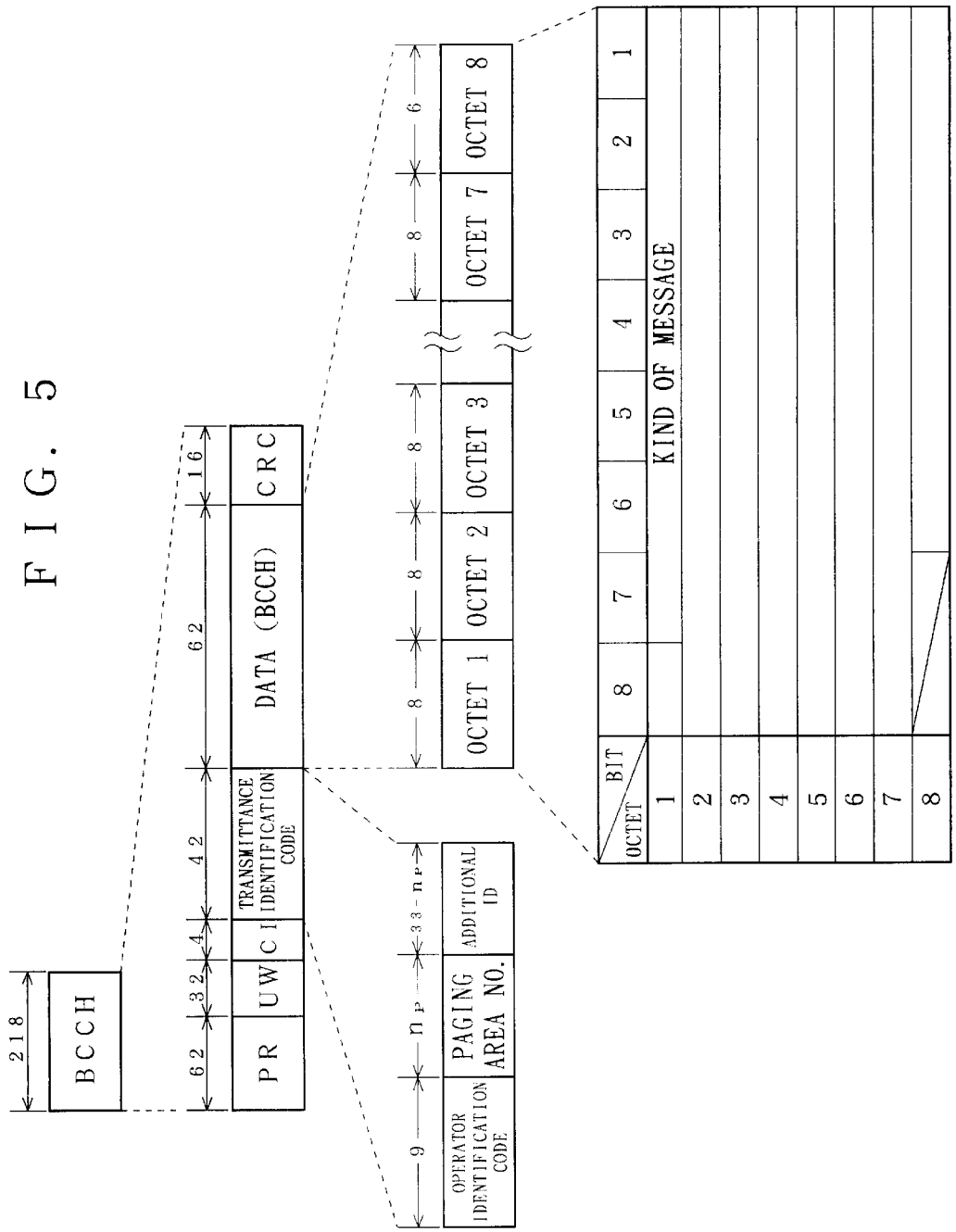
FIG. 5 is a diagram showing the constitution of BCCH.

FIG. 5 shows the constitution of BCCH. BCCH is a down uni-directional channel for informing broadcast control information from CS to PS. Information related to channel structure, system information and so on are transmitted by BCCH.

BCCH is constituted by a preamble pattern (PR), a unique word for synchronization (UW), a channel identifier (CI), a transmission identification code, data (BCCH) and a cyclic redundancy check (CRC). Further, the transmission identification code is constituted by a operator identification code, a paging area number and an additional ID. Further, data (BCCH) is constituted by octet 1 through octet 8. Further, kind of message by octet 2 through octet 8 is shown by lower 7 bits of octet 1.

Figure 6:
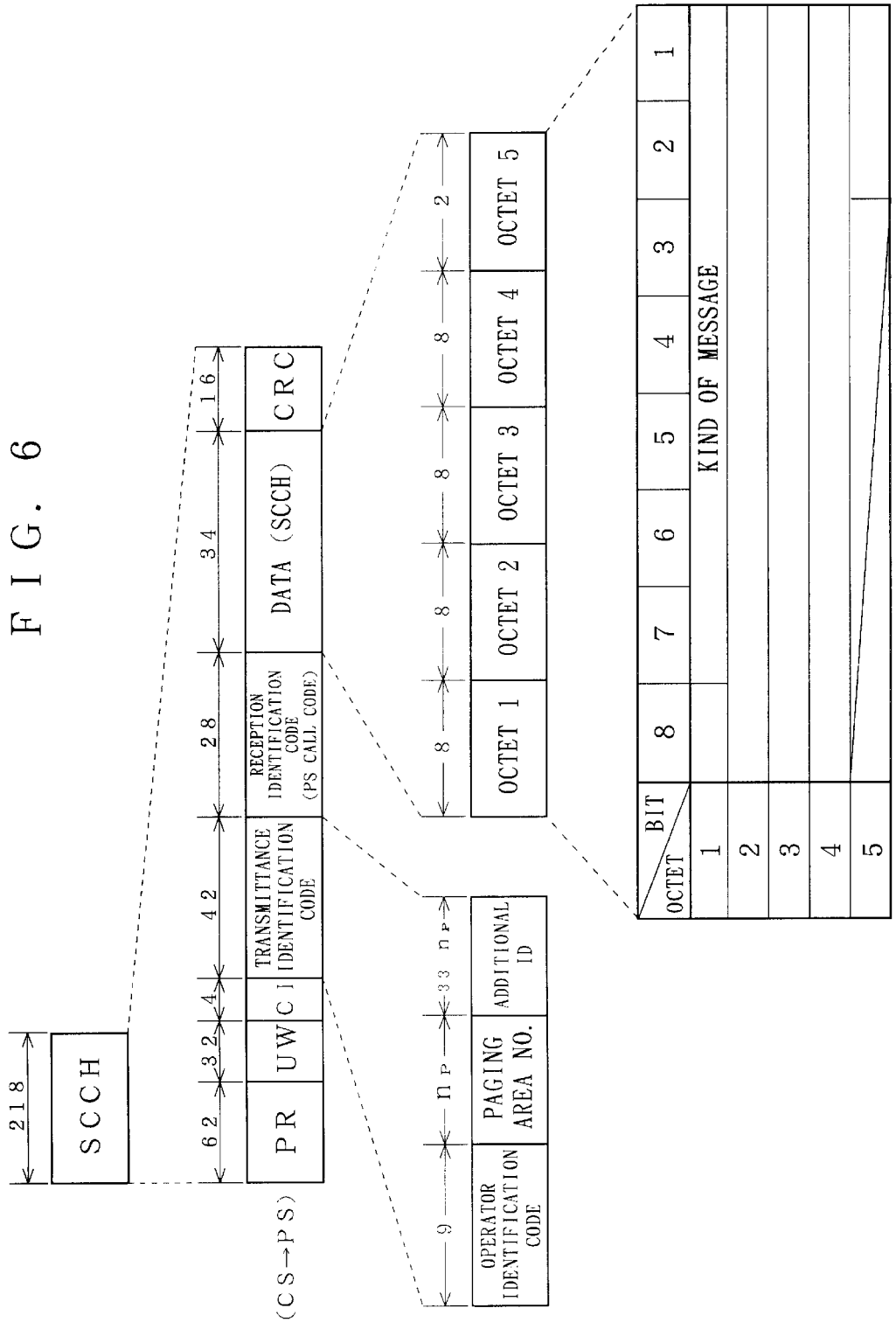
FIG. 6 is a diagram showing the constitution of SCCH.

FIG. 6 shows the constitution of SCCH. SCCH is a point-to-point bi-directional channel for transmitting information necessary for connecting call between CS and PS. According to SCCH, independent information is transmitted to each cell.

SCCH is constituted by a preamble pattern (PR), a unique word for synchronization (UW), a channel identifier (CI), a transmission identification code, a reception identification code, data (SCCH) and a cyclic redundancy check (CRC). Further, according to SCCH (down), the transmission identification code is constituted by a operator identification code, a paging area number and an additional ID and the reception identification code is constituted by a PS identification (PS-ID). Although not illustrated, according to SCCH (up), the transmission identification code mentioned above is constituted as the reception identification code and the reception identification code mentioned above is constituted as the transmission identification code. Data (SCCH) is constituted by octet 1 through octet 5. Further, kind of message by octet 2 through octet 5 is shown by lower 7 bits of octet 1.

PCH is a down uni-directional channel of point-to-multipoints for paging the same information from CS to PSs over a wide area (paging area) composed of a single cell and/or a plurality of cells. By PCH, CS informs to PS that call is present. As shown by FIG. 4, a plurality of number of PCHs (PCH1 through PCHn) are present in the LCCH super frame.

Figure 7:
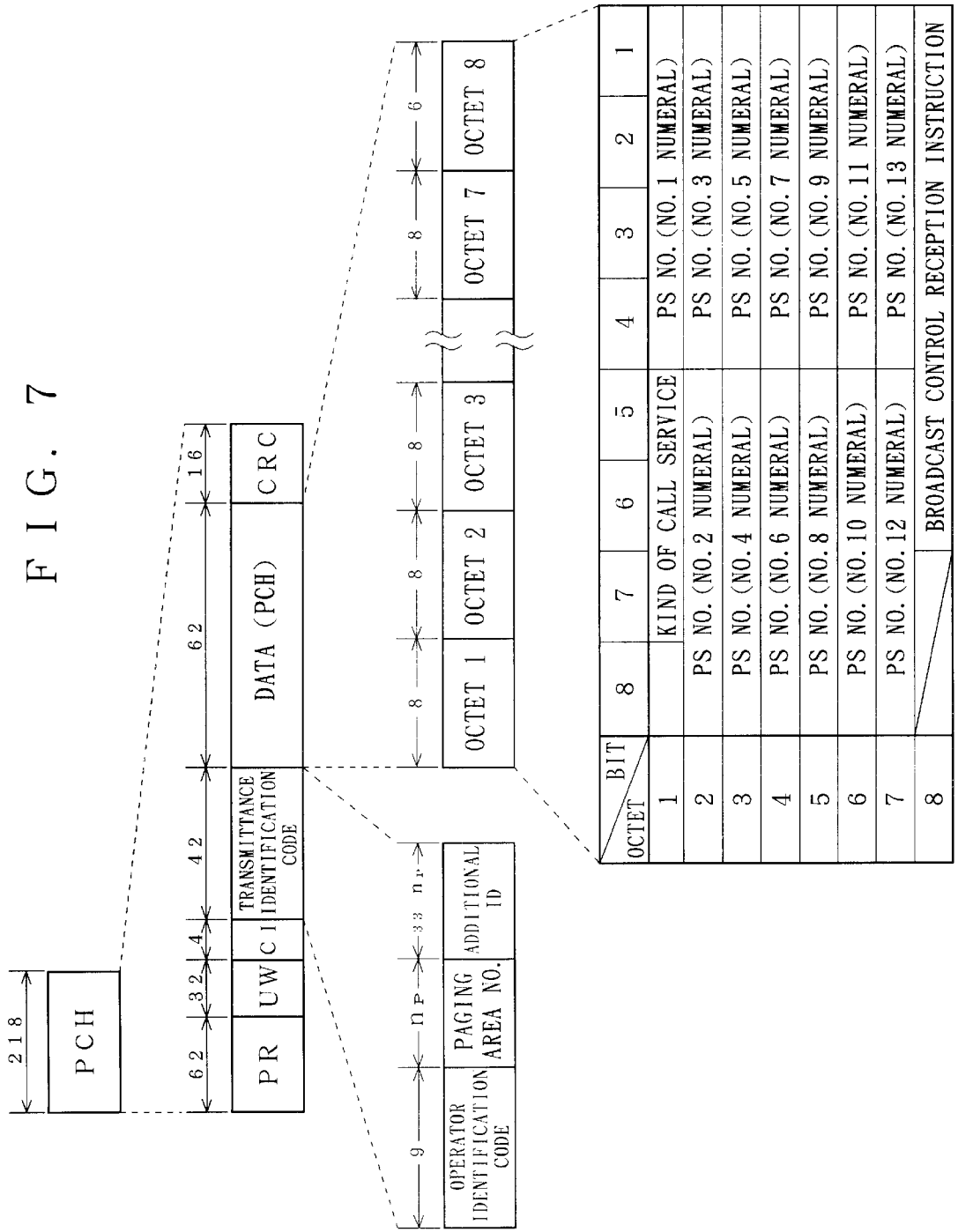
FIG. 7 is a diagram showing the constitution of PCH.

FIG. 7 shows the constitution of PCH. PCH is constituted by a preamble pattern (PR), a unique word for synchronization (UW), a channel identifier (CI), a transmission identification code, data (PCH) and a cyclic redundancy check (CRC). Further, the transmission identification code is constituted by a operator identification code, a paging area number and an additional ID. Further, the data (PCH) is constituted by octet 1 through octet 8.

In this case, PCH defines only a single message and therefore, PCH is not provided with an area indicating kind of message. Kind of call service such as no call, call service by a PS number indicated by a thirteenth digit or lower of BCD, call service by a PS number of hexadecimal seven digit or the like is displayed by 5 through 7 bits of octet 1. Further, the PS number is shown by octets 1 through 7. Further, reception instruction of an broadcast control channel (BCCH) is carried out by octet 8. When there causes a change in an intermittent reception, mentioned later, PS receives BCCH by the reception instruction.

Further, PS recognizes PCH to be received from a plurality of PCHs (PCH1 through PCHn) by a reception signal group number. In respect of PS, the reception signal group number is calculated by Equation (1) based on PS number and content of BCCH from CS ($n_{PCH}$, $n_{GROUP}$, constitution of a carrier for control) In this equation, notation $n_{PCH}$ designates a number of same reception signal group and notation $n_{GROUP}$ designates a reception signal group factor. Further, when two frequencies (2LCCH) are used and the reception groups of PCH relate to each other, X=2 and otherwise X=1.

$$\text{Reception signal group number} = (\text{PS NO.}) \text{MOD}(n_{PCH} \times n_{GROUP} \times X) + 1 \quad (1)$$

As described above, after finishing location registration, the system returns to its control channel receiving state and is brought into a standby state. In the standby state, the telephone (PS) 10 is shifted to intermittent receiving in which only PCH in correspondence with the calculated reception signal group number is received. In this case, PCH in correspondence with the calculated reception signal group number is present at every LCCH super frame and accordingly, intermittent receiving at every 1.2 seconds is constituted.

Further, when the control channel cannot be received, for example, by moving the telephone outside of the service area of the cell station or the like in the standby state, the microcomputer 11 detects that synchronism with the control channel is made off. In this case, similar to the case of power ON mentioned above, the synchronism with the control channel is established by receiving the control channel and thereafter, the location thereof is registered and the system is shifted to a standby state. The microcomputer 11 has a function of counting a number X of out-of-synchronism during a fixed time period of past, for example, one hour according to this embodiment. Normally, the more frequent a user moves, the larger the number X of out-of-synchronism becomes.

Figure 8:
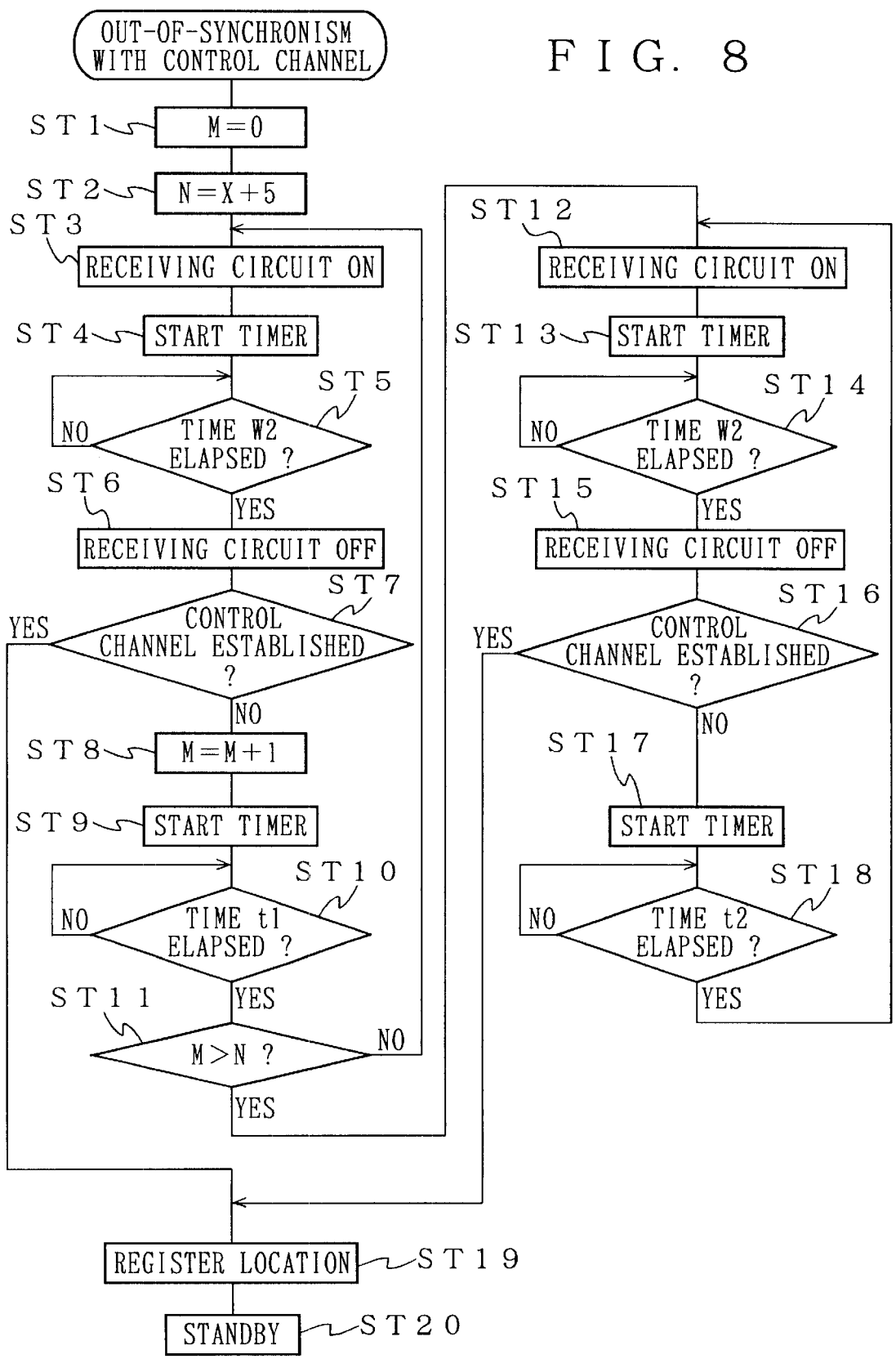
FIG. 8 is a flowchart showing a control example in the case where synchronism with a control channel is made off.

The microcomputer 11 controls the operation of the system in accordance with a flowchart shown by FIG. 8 when the synchronism with the control channel is made off.

First, at step ST1, M=0 is set and at step ST2, N=X+5 is set. Notation M designates a number of bringing about the control channel receiving state in order to establish the synchronism with the control channel (i.e.,number of retrial) and notation X designates a number of out-of-synchronism during past one hour. Next, at step ST3, receiving circuits such as the wireless unit 13, the digital modulating and demodulating unit 14, the TDMA processing unit 15 are brought into an ON state and at step ST4, a timer is started. In this case, the timer is constituted by the timer unit 28 and is reset in starting operation.

Next, at step ST5, it is determined whether a time period W2 has elapsed.. In this case, the time period W2 is a time period for receiving control channel at each time in the intermittent reception and is set to, for example, 220 ms. When the time period W2 has elapsed, at step ST6, the receiving circuits are brought into an OFF state. Further, at step ST7, it is determined whether the synchronism with the control channel has been established by receiving the control channel from the cell station while the receiving circuits stay on the ON state.

When, at step ST7, it is determined that the synchronism with the control channel has not been established, at step ST8, M is incremented and, at step ST9, a timer is started. Further, at step ST10, it is determined whether a time period t1 has elapsed. The time period ti is an interval between each period of the control channel receiving state and according to the embodiment is set to, for example 6 seconds. At step ST11, whether M>N is determined where the time period t1 has elapsed.

When M>N is not established in step ST11, the operation returns to step ST3 and then the receiving circuits are brought into the ON state and the above-described operations are repeated. When M>N at step ST11, at step ST12, the receiving circuits are brought into the ON state and, at step ST13, a timer is started.

Next, at step ST14, it is determined whether the time period W2 has elapsed. When the time period W2 has elapsed, at step ST15, the receiving circuits are brought into the OFF state. Further, at step ST16, it is determined whether the synchronism with the control channel has been established by receiving the control channel from CS while the receiving circuits stay on the ON state. When, at step ST16, it is determined that the synchronism with the control channel has not been established, at step ST17, a timer is started.

Next, at step ST18, it is determined whether a time period t2 has elapsed. The time period t2 is an interval between each period of the control channel receiving state and, according to the embodiment, it is set to, for example, 30 seconds. When the time period t2 has elapsed, the operation returns to step ST12 and then the receiving circuits are brought into the ON state and the above-described operations are repeated.

Further, when, at step ST7, the control channel has been established, at step ST19, the location is registered and, at step ST20, the system is shifted to the standby state.

According to the operation by the flowchart of FIG. 8, the more frequently a user moves, the larger the number X of out-of-synchronism becomes and accordingly, N becomes larger by that amount and the period of time until the interval t1 (6 seconds) between each period of the control channel receiving state is changed to the interval t2 (30 seconds), is increased.

Therefore, where a user moves frequently and moves back highly probably into the service area of the cell station even if the user moves outside of the service area of the cell station, the control channel receiving state is frequently brought about and where the user moves back into the service area of the cell station, the establishment of the synchronism with the control channel is swiftly carried out. In the meantime, where the user moves infrequently, and a possibility where the user moves back into the service area of the cell station again after moving outside of the service area of the cell station, is low, the frequency of bringing about the control channel receiving state is lowered and thus emphasis is put on preventing a battery from its consumption. Accordingly, consumption of a battery can be prevented in compliance with situation of moving of a user.

FIG. 9A shows waveform of consumption current in the operation by the flowchart of FIG. 8. In this case, the consumption current is I1 (for example, 4 mA) when the receiving circuits stay on OFF state and consumption current is I2 (for example, 180 mA) when the receiving circuits stay on ON state. Further, in the intermittent reception under the standby state, the synchronism with the control channel is established and only PCH in correspondence with the calculated reception signal group number is received and accordingly, the reception time period W1 at each time is set to, for example, 48 ms.

Further, according to the telephone 10 shown by FIG. 1, when the telephone number of called party is inputted by key operation at the key input unit 24 (ten keys 48 or the like), or the speaking key 42 is operated after searching redial data or telephone book data, firstly, telephone number data or the like are supplied to the TDMA processing unit 15 as control data by the microcomputer 11 and are transmitted to the cell station via the control channel. Thereby, connection is made to the called party and a speaking state is brought about.

In this case, although telephone conversation is carried out by using the speaking channel, in processing connection, the communication frequency data of the speaking channel and the data relating to the slot positions each of which are transmitted as control data from the cell station by using the control channel, are supplied to the microcomputer 11 via the TDMA processing unit 15. The microcomputer 11 makes the transmission and reception frequency coincide with the communication frequency of the speaking channel by controlling the wireless unit 13 based on the communication frequency data and sets slots selected by the TDMA processing unit 15 on the basis of the slot position data. Accordingly, speaking is carried out by using the speaking channel informed from the cell station.

Further, in the case that call data is supplied to the microcomputer 11 via the TDMA processing unit 15 and reception of signal is detected when the call data is transmitted as control data from the cell station by using the control channel, the alerting sound output unit 23 is controlled by the microcomputer 11 and thus the alerting sound is outputted thereby. Alternatively, the telephone main body 40 is vibrated by controlling the vibration generating unit 22 by the microcomputer 11.

When the speaking key 42 is operated and a response is produced in a state that the call operation is being carried out, response data is supplied as control data from the microcomputer 11 to the TDMA processing unit 15 and is transmitted to the cell station via the control channel. Thereby, connection with the called party is carried out and the speaking state is brought about. Also in this case, telephone conversation is carried out by using the speaking channel informed from the cell station.

In the speaking state, compressed voice data transmitted via the speaking channel is outputted from the TDMA processing unit 15. The compressed voice data is supplied to the voice codec unit 16, subjected to a decoding processing and thereafter converted into an analog signal. Further, the received voice signal outputted from the voice codec unit 16 is supplied to the speaker 17 and voice is outputted from the speaker 17.

Further, a transmitting voice signal outputted from the microphone 18 is supplied to the voice codec unit 16, converted into a digital signal and thereafter subjected to compressed code forming processing whereby compressed voice data is formed. Further, the compressed voice data outputted from the voice codec unit 16 is supplied to the TDMA processing unit 15 and is transmitted to the called party via the speaking channel.

In this case, by operating "↓" key of the cursor moving key 45, transmission of character data can be carried out by using the ten keys 48 or the special input keys 49 and 45. In this case, DTMF signals in correspondence with the operated keys are outputted from the DTMF modulating and demodulating unit 19 and is supplied to the voice codec unit 16 as a transmitting voice signal.

Further, when the telephone is set to an absence recording mode in the case where the call data are supplied from the TDMA processing unit 15 to the microcomputer 11 and the reception of signal is detected as mentioned above, a response is made automatically after outputting alerting sound for a predetermined period of time, and the speaking state is brought about. Further, after transmitting to the calling side the response message that a received voice signal will be recorded, recording of the received voice signal is started at the voice recording and reproducing unit 21.

Further, when character message data by a DTMF signal are transmitted from the called party during an absence recording or during a telephone conversation, key data outputted from the DTMF modulating and demodulating unit 19 is converted into character data based on control of the microcomputer 11 in reference to the conversion format storing unit 20 and the character data is written to a character message area of the non-volatile memory 25. When the character data is written to the non-volatile memory 25 in this way, the character message of the character data is displayed on the liquid crystal display 26 and can be confirmed by operating to push "↑" key of the cursor moving key 45 for a long period of time,.

Figure 10:
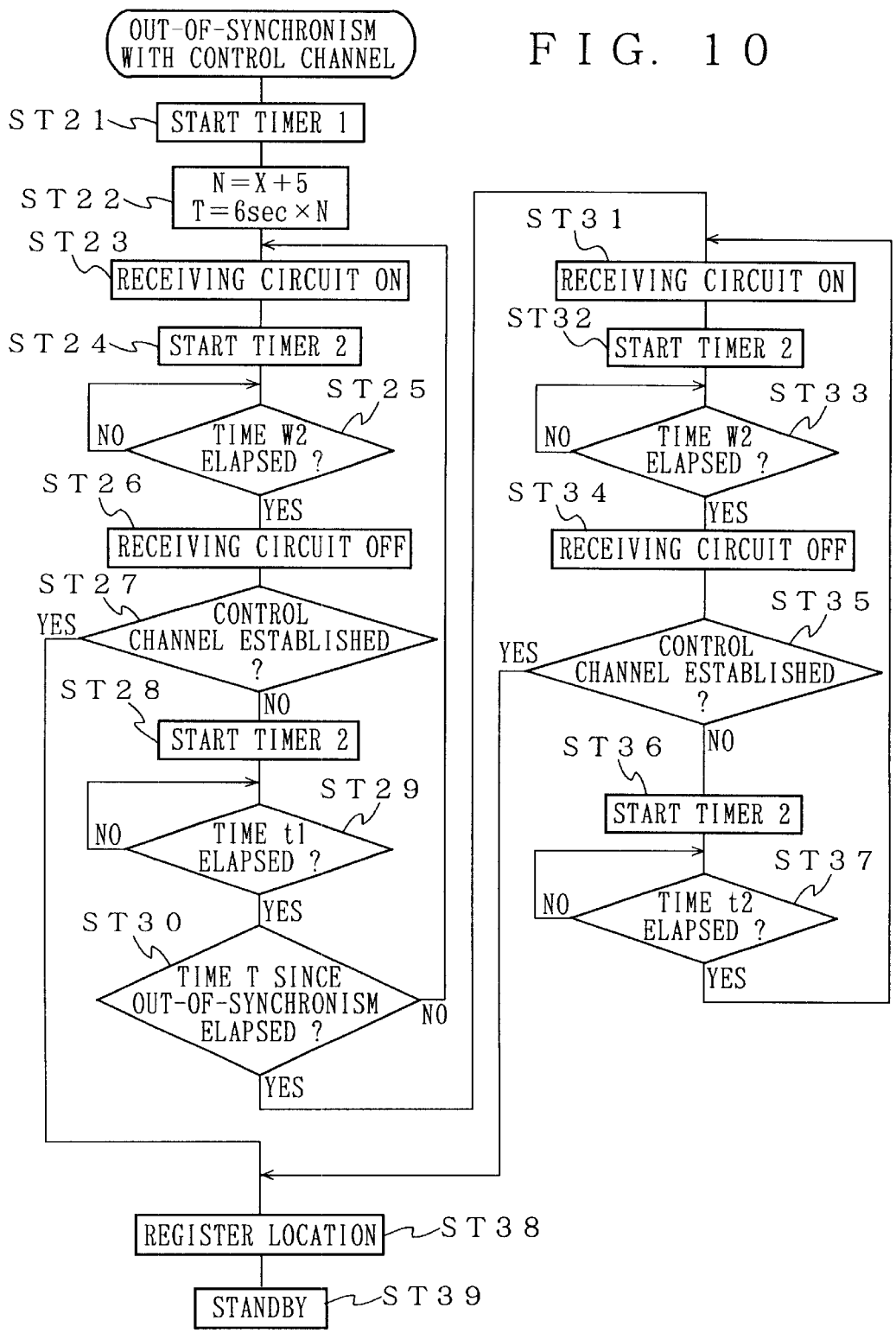
FIG. 10 is a flowchart showing other control example in the case where synchronism with the control channel is made off.
Figure 11:
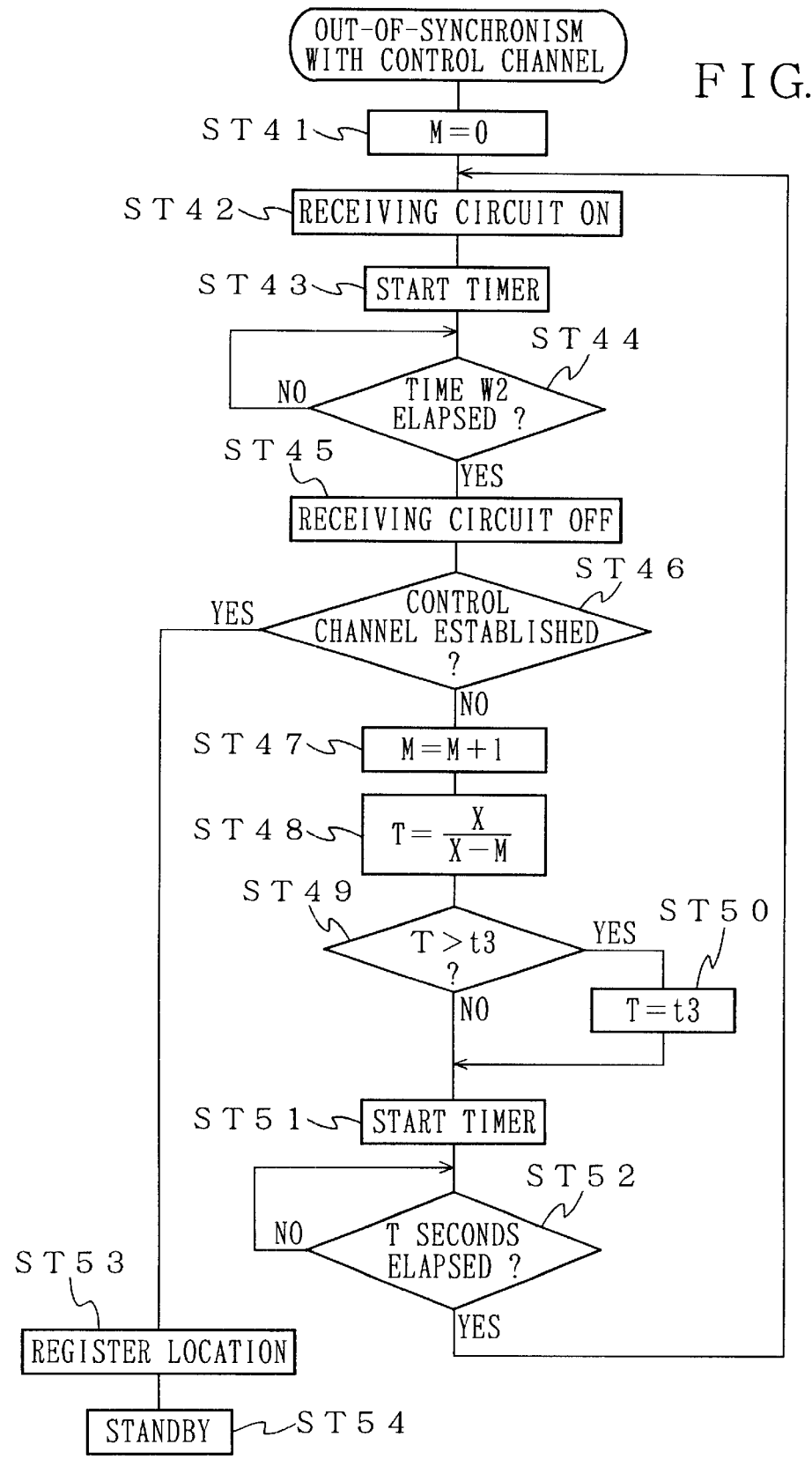
FIG. 11 is a flowchart showing still other control example in the case where synchronism with the control channel is made off.

Although, according to the above-described embodiment, the microcomputer 11 controls the operation of the system in accordance with the flowchart shown by FIG. 8 when the synchronism with the control channel is made off, it is conceivable to control the operation of the system also in accordance with flowcharts shown by FIG. 10 and FIG. 11.

An explanation will be given of control in accordance with a flowchart of FIG. 10.

First, at step ST21, a timer 1 is started and at step ST22, N=X+5 and T=6 seconds×N are set. Notation X designates a number of out-of-synchronism during past one hour. The timer 1 is constituted by the timer unit 28 and is reset at starting operation. The same goes with a timer 2, mentioned later.

Next, at step ST23, receiving circuits such as the wireless unit 13, the digital modulating and demodulating unit 14, the TDMA processing unit. 15 are brought into an ON state and at step ST24, the timer 2 is started. Further, at step ST25, it is determined whether the time period W2 has elapsed. When the time period W2 has elapsed, at step ST26, the receiving circuits are brought into an OFF state. Further, at step ST27, it is determined whether the synchronism with the control channel has been established by receiving the control channel from the cell station while the receiving circuits stay on the ON state.

When, at step ST27, it is determined that the synchronism with the control channel has not been established, at step ST28, the timer 2 is started. Further, at step ST29, it is determined whether a time period t1 (for example, 6 seconds) has elapsed. When the time period t1 has elapsed, at step ST30, it is determined whether a time period T since the synchronism with the control channel has been made off has been-elapsed in reference to the timer 1.

When, at step ST30, the time period T has not been elapsed, the operation returns to step ST23 and then the receiving circuits are brought into the ON state and the above-described operations are repeated. When, at step ST30, the time period T has elapsed, at step ST31, the receiving circuits are brought into the ON state and, at step ST32, the timer 2 is started.

Next, at step ST33, it is determined whether the time period W2 has elapsed. When the time period W2 has elapsed, at step SR34, the receiving circuits are brought into the OFF state. Further, at step ST35, it is determined whether the synchronism with the control channel has been established by receiving the control channel from the cell station while the receiving circuits stay on the ON state. When, at step ST35, it is determined that the synchronism with the control channel has not been established, at step ST36, the timer 2 is started.

Next, at step ST37, it is determined whether a time period t2 (for example, 30 seconds) has elapsed. When the time period t2 has elapsed, the operation returns to step ST31 and then the receiving circuits are brought into the ON state and the above-described operations are repeated.

Further, when, at step ST35, the control channel has been established, at step ST38, the location is registered and, at step ST39, the system is shifted to a standby state.

According to the operation in accordance with the flowchart of FIG. 10, the more frequently the user moves, the larger the number X of times of out-of-synchronism becomes and accordingly, T becomes large by that amount and a period of time until the interval t1 (6 seconds) between each period of the control channel receiving state is changed to the interval t2 (30 seconds), is prolonged. Accordingly, similar to the control in accordance with the flowchart of FIG. 8, consumption of a battery can be prevented in compliance with a situation of movement of a user.

Further, waveform of consumption current in the operation by the flowchart of FIG. 10 is also the one as shown in FIG. 9A.

An explanation will be given of control in accordance with a flowchart of FIG. 11.

First, at step ST41, M=0 is set. Notation M designates a number of times for bringing about the control channel receiving state in order to establish the synchronism with the control channel (number of retrial). Next, at step ST42, receiving circuits such as the wireless unit 13, the digital modulating and demodulating unit 14, the TDMA processing unit 15 are brought into an ON state and, at step ST43, a timer is started. In this case, the timer is constituted by the timer unit 28 and is reset in starting operation.

Next, at step ST44, it is determined whether a time period W2 has elapsed. In this case, the time period W2 is a reception time period at each time in the intermittent reception and is set to, for example, 220 ms. When the time period for recievins control channel W2 has elapsed, at step ST45, the receiving circuits are brought into an OFF state. Further, at step ST46, it is determined whether the synchronism with the control channel has been established by receiving the control channel from the cell station while the receiving circuits stay on the ON state.

When, at step ST46, it is determined that the synchronism with the control channel has not been established, at step ST47, M is incremented and, at step ST48, calculation of T=X/(X−M) is carried out. In this case, T seconds is an interval between each period of the control channel receiving state and the larger the number of M of retrial becomes, the longer it becomes.

Next, at step ST49, it is determined whether T>t3 is established. In this case, t3 is a maximum value of the interval between each period of control channel receiving state and is set to, for example, 30 seconds. When T>t3 is not established, the operation proceeds directly to step ST51 and in the meantime, when T>t3, the operation proceeds to step ST51 after setting T=t3 at step ST50.

At step ST51, a timer is started. Further, at step ST52, it is determined whether T seconds has elapsed. When T seconds has elapsed at step ST52, the operation returns to step ST42 and the receiving circuits are brought into the ON state and then the above-described operations are repeated.

Further, when, at step ST46, the control channel has been established, at step ST53, the location is registered and, at step ST54, the system is shifted to a standby state.

According to the operation by the flowchart of FIG. 11, the number M of retrial is successively increased and accordingly, the interval T between each period of the control channel receiving state is successively increased. In this case, the more frequently the user moves, the larger the number X of out-of-synchronism becomes and accordingly, a width of increase of the interval T is reduced. Therefore, similar to the control by the flowchart of FIG. 8, consumption of a battery can be prevented in compliance with a situation of movement of the user. FIG. 9B shows waveform of consumption current in the operation by the flowchart of FIG. 11.

Further, although according to the above-described embodiments, the present invention is applied to a simplified type portable telephone, the present invention is naturally applicable similarly to other portable terminal equipment establishing synchronism with the control channel by carrying out intermittent reception of the control channel when the synchronism of the control channel is made off.

Industrial Applicability

As described above, a portable terminal equipment according to the present invention is preferably applied to a portable terminal equipment of a portable telephone or the like establishing synchronism with a control channel by carrying out intermittent reception of the control channel when the synchronism with the control channel is made off.

What is claimed is:

1. A portable terminal equipment for use in conjunction with a cell station that transmits a control channel, the portable terminal equipment comprising:

a control channel receiving moans having a control channel receiving state for receiving the control channel, an out-of-synchronism detecting means for detecting that the equipment is not synchronized with the control channel, an out-of-synchronism occurrence counting means responsive to the out-of-synchronism detecting means for counting number of times that the out-of-synchronism detecting means has detected that the equipment is not synchronized with the control channel during a preceding time period of predetermined duration, and a reception controlling means responsive to the out-of-synchronism occurrence counting means for intermittently placing the control channel receiving means at a rate of occurrence such that, when the out-of-synchronism with the control channel is detected by the out-of-synchronism detecting means, the more the number of times of out-of-synchronism during the preceding time period of predetermined duration, the higher the rate of occurrence is made, the number of times being provided by the out-of-synchronism occurrence counting means.

2. The portable terminal equipment according to claim 1, wherein the reception controlling means periodically places the control channel receiving means in the control channel receiving state at intervals of a first time period during a predetermined time period after the out-of-synchronism receiving means detects that the equipment is not synchronized with the control channel, thereafter the reception controlling means periodically places the control channel receiving means in the control channel receiving state at intervals of a second time period, which is longer than the first time period, and wherein the reception controlling means sets duration of the predetermined time period dependent on the number counted by the out-of-synchronism occurrence counting means such that the greater the number counted, the greater the duration of the predetermined time period.

3. The portable terminal equipment according to claim 1, wherein the reception controlling means periodically places the control channel receiving means in the control channel receiving state at intervals of a first time period a predetermined number of times after the out-of-synchronism receiving means detects that the equipment is not synchronized with the control channel, thereafter the reception controlling means periodically places the control channel receiving means in the control channel receiving state at intervals of a second time period, which is longer than the first time period, and wherein the reception controlling means sets said predetermined number of times dependent on the number counted by the out-of-synchronism occurrence counting means such that the greater the number counted, the greater the predetermined number of times.

4. The portable terminal equipment according to claim 1, wherein the reception controlling means increases duration of the interval between placing the control channel receiving means in the control channel receiving state and reduces magnitude of the increase in the duration of the interval depending on the number counted by the out-of-synchronism occurrence counting means during the preceding time period of predetermined duration, such that the greater the number counted by the out-of-synchronism occurrence counting means during the preceding time period of predetermined duration, the smaller the magnitude of said increase.

5. The portable terminal equipment according to claim 4, including a means for setting a maximum value of the interval between placing the control channel receiving means in the control channel receiving state.

6. A portable terminal equipment for use in conjunction with a cell station that transmits a control channel, the portable terminal equipment comprising:

a control channel receiving means having a control channel receiving state for receiving the control channel, an out-of-synchronism detecting means for detecting that the equipment is not synchronized with the control channel, an out-of-synchronism occurrence counting means responsive to the out-of-synchronism detecting means for counting number of times that the out-of-synchronism detecting means has detected that the equipment is not synchronized with the control channel during a preceding time period of predetermined duration, and a reception controlling means responsive to the out-of-synchronism occurrence counting means for intermittently placing the control channel receiving means in the control channel receiving state after the out-of-synchronism detecting means detects that the equipment is not synchronized with the control channel, wherein the reception controlling means has a first mode of operation in which it places the control channel receiving means in the control channel receiving state at intervals of a first time period and a second mode of operation in which it places the control channel receiving means in the control channel receiving state at intervals of a second time period, wherein the first time period is shorter than the second time period, and wherein the reception controlling means operates in the first mode for an interval that is longer, the higher the number counted by the out-of-synchronism occurrence counting means.

7. The portable terminal equipment according to claim 6, wherein the reception controlling means counts the number of times that it places the control channel receiving means in the control channel receiving state in the first mode of operation and wherein the interval for which the reception controlling means operates in the first mode depends on the number counted by the reception controlling means.

8. The portable terminal equipment according to claim 7, wherein the reception controlling moans compares the number counted by the reception controlling means with the number counted by the out-of-synchronism occurrence counting means and the reception controlling means changes from the first mode to the second mode when the number counted by the reception controlling means bears a predetermined relationship to the number counted by the out-of-synchronism occurrence counting means.

9. The portable terminal equipment according to claim 7, wherein the reception controlling means changes from the first mode to the second mode when the number counted by the reception controlling means exceeds the number counted by the out-of-synchronism occurrence counting means by a predetermined amount.

10. The portable terminal equipment according to claim 6, wherein the reception controlling means measures the time for which it has operated in the first mode of operation and the reception controlling means changes to the second mode of operation when the time measured by the reception controlling means bears a predetermined relationship to a time value that depends on the number counted by the out-of-synchronism occurrence counting means.

11. The portable terminal equipment according to claim 10, wherein the reception controlling means calculates a number that exceeds by a predetermined amount the number counted by the out-of-synchronism a occurrence counting means and calculates said time value by multiplying the calculated number by a predetermined period, and the reception controlling means changes from the first mode to the second mode when the time measured by the reception controlling means exceeds the calculated time value.

12. The portable terminal equipment according to claim 6, wherein the reception controlling means increases duration of the first time period and reduces magnitude of the increase in the duration of the first time period depending on the number counted by the out-of-synchronism occurrence counting means, such that the greater the number counted by the out-of-synchronism occurrence counting means, the smaller the magnitude of said increase.

13. The portable terminal equipment according to claim 12, including a means for setting a maximum value of the first time period.

14. A portable terminal equipment for use in conjunction with a cell station that transmits a control channel, the portable terminal equipment comprising:

a control channel receiving means having a control channel receiving state for receiving the control channel, an out-of-synchronism detecting means for detecting that the equipment is not synchronized with the control channel, an out-of-synchronism occurrence counting means responsive to the out-of-synchronism detecting means for counting number of times that the out-of-synchronism detecting means has detected that the equipment is not synchronized with the control channel during a preceding time period of predetermined duration, and a reception controlling means responsive to the out-of-synchronism occurrence counting means for intermittently placing the control channel receiving means in the control channel receiving state after the out-of-synchronism detecting means detects that the equipment is not synchronized with the control channel, wherein the reception controlling means has a first mode of operation in which it places the control channel receiving means in the control channel receiving state a number of times that depends on the number counted by the out-of-synchronism occurrence counting means and at successively increasing intervals, and a second mode of operation in which it places the control channel receiving means in the control channel receiving state at intervals of predetermined duration.

15. The portable terminal equipment in accordance with claim 14, wherein the reception controlling means successively decreases the increase in duration of the intervals in the first mode of operation.

* * * * *